United States Patent [19]

Stelter

[11] Patent Number: 5,036,362
[45] Date of Patent: Jul. 30, 1991

[54] SEQUENTIAL DEVELOPMENT WITH MAGNETIC AND NON-MAGNETIC TONER

[75] Inventor: Eric C. Stelter, Rochester, N.Y.

[73] Assignee: Eastman Kodak Company, Rochester, N.Y.

[21] Appl. No.: 545,165

[22] Filed: Jun. 28, 1990

[51] Int. Cl.⁵ .......................................... G03G 15/06
[52] U.S. Cl. ................................. 355/245; 355/251; 355/328; 430/122
[58] Field of Search ..................... 355/245, 251, 328; 430/122

[56] References Cited

U.S. PATENT DOCUMENTS

| | | | |
|---|---|---|---|
| 4,509,850 | 4/1985 | Weigl | 355/4 |
| 4,572,647 | 2/1986 | Bean et al. | 355/239 |
| 4,901,114 | 2/1990 | Parker et al. | 355/245 |

FOREIGN PATENT DOCUMENTS 203478 9/1986 Japan .................................. 355/251

Primary Examiner—A. T. Grimley
Assistant Examiner—Patrick J. Stanzione
Attorney, Agent, or Firm—Milton S. Sales

[57] ABSTRACT

Electrostatographic reproduction apparatus has two development stations in tandem to first develop a latent image with magnetic toner so that small details, lines, and the edges of solids are developed; and to then develop the remaining undeveloped or underdeveloped portions of the latent image with non-magnetic toner to fill in the inside of the solid areas. Preferably, the magnetic toner development station has a development electrode spaced further from the photoconductor than the electrode of the non-magnetic toner development station.

5 Claims, 1 Drawing Sheet

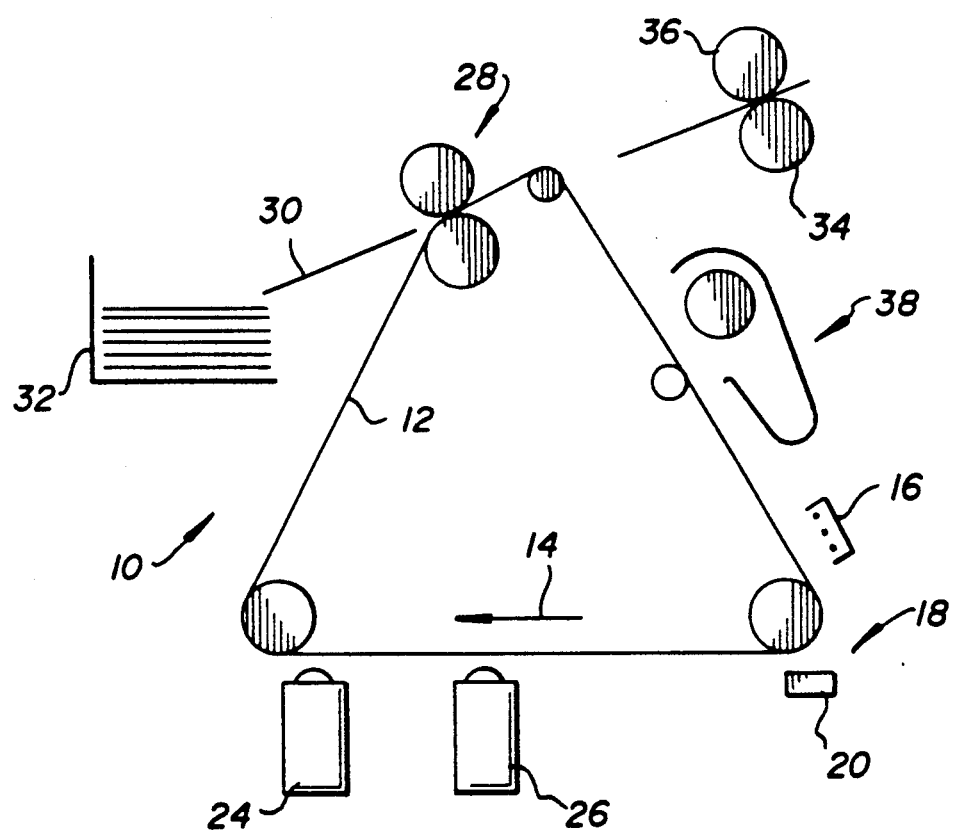

SEQUENTIAL DEVELOPMENT WITH MAGNETIC AND NON-MAGNETIC TONER

BACKGROUND OF THE INVENTION

1. Technical Field

This invention relates generally to printing machine-readable documents using magnetic toners, and more particularly to such printing wherein images having large solid areas are enhanced.

2. Background Art

The use of magnetic toner for creating magnetic image character recognition (MICR) such as used for bank checks is well known. U.S. Pat. No. 4,901,114 to Parker et al. discloses such a printer wherein magnetic toner is used to print those parts of the image that are necessary of the character recognition system, and non-magnetic, less expensive toner is used to print those remaining portions of the image.

Magnetic toner development stations generally have stringent specifications optimized for producing line images. Due to the magnetic attraction of magnetic toner to the magnets used in magnetic brush development stations, it is very difficult to develop large solid areas. This problem is compound because the relatively non-conductive magnetic toner tends to work its way between adjacent, conductive carrier particles, making the carrier chains non-conductive.

Although the Parker et al. patent discloses single-pass developent to print magnetic toner MICR images and non-magnetic toner images on the same document, that patent is concerned with printing different portions of the document with different toners; and not with using non-magnetic toner to fill in solid areas which are edged with magnetic toner.

3. Disclosure of Invention

Accordingly, it is a feature of the present invention to first develop a latent image with magnetic toner so that small details, line, and the edges of solids are developed; and to then develop the remaining undeveloped or underdeveloped portions of the latent image with non-magnetic toner to fill in the inside of the solid areas. Preferably, the magnetic toner development station has a development electrode spaced further from the photoconductor than the electrode of the non-magnetic toner development station.

The invention, and its objects and advantages, will become more apparent in the detailed description of the preferred embodiments presented below.

BRIEF DESCRIPTION OF THE DRAWINGS

In the detailed description of the prefered embodiments of the invention presented below, reference is made to the accompanying drawing which is a schematic block diagram of reproduction apparatus according to a preferred embodiment of the present invention.

BEST MODE FOR CARRYING OUT THE INVENTION

The present description will be directed in particular to elements forming part of, or cooperating more directly with, apparatus in accordance with the present invention. It is to be understood that elements of the preferred embodiment that are not specifically shown or described may take various forms well known to those skilled in the art.

Referring to the drawing, an electrostatographic document reproduction apparatus 10 such as a copier or printer has an image transfer member such as a photoconductive belt 12, which is moved in a clockwise direction as represented by an arrow 14.

A charging station 16 applies an electrostatic charge to belt 12. At an exposure station 18, projected light from a write head 20 dissipates the electrostatic charge on the photoconductive belt to form a latent electrostatic image corresponding to the image of an original to be copied or printed. Write head 20 preferably has an array of light emitting diodes (LEDs) for exposing the photoconductive belt, but it is to be understood that other technologies are equally applicable to the present invention. For example, the apparatus may be an optical copier, stylus or pin recorder, etc.

The latent electrostatic image on belt 12 is developed with toners at development stations 24 and 26, as will be explained in detail below. As the toner image on belt 12 approaches a transfer station 28, an image receiver sheet 30 is fed from a supply 32. After transfer of the toner image to the receiver sheet, the receiver sheet separates from the belt and is passed through a pair of heated fuser rollers 34 and 36. Mechanical and electrical cleaning of belt 12 is effected at a cleaning station 38.

At development station 26, a magnetic brush development system advances magnetic toner type developer mixture into contact with the electrostatic latent images. The development electrode of station 26, which could be the sleeve of a conventional magnetic brush, is perferably relatively far from the photoconductor belt so that predominately small details, lines, and the edges of solids are developed, with only little development occurring inside solid areas.

At development station 24, a magnetic brush development system advances non-magnetic toner type developer mixture into contact with the electrostatic latent images. The remaining undeveloped, or underdeveloped, portions of the latent image are development at station 24 with non-magnetic toner using a development electrode that is relatively close to the photoconductor belt to fill in the solid areas. The electrode of station 24 could also be the sleeve of a conventional magnetic brush.

Thus, the present invention allows use of a development station optimized for producing magnetic toner images, which are primarily line images, followed by a development station optimized for non-magnetic toner images, which often include solid areas. By using two developer stations in tandem, one immediately downstream from the other, the present invention provides a means for producing MICR characters with good signal strength, and solid areas wirth good density characteristics.

The invention has been described in detail with particular reference to prefered embodiments thereof, but it will be understood that variations and modifications can be effected within the spirit and scope of the invention.

What is claimed is:

1. An electrostatographic reproduction apparatus comprising:
   an image transfer member;
   means for producing an electrostatic latent image on said image transfer member;
   a first development station adapted to develop small details, lines, and the edges of solid areas of said latent image with magnetic toner; and a second development station adapted to develop the inside of solid areas of said latent image with non-magnetic toner.

2. An electrostatographic reproduction apparatus as set forth in claim 1 wherein said first and second development stations are positioned in tandem.

3. An electrostatographic reproduction apparatus as set forth in claim 2 wherein said first development station precedes said second development station.

4. An electrostatographic reproduction apparatus as set forth in claim 1 wherein:

said first and second development stations include respective first and second development electrodes; and said first development electrode is spaced further from the image transfer member than the second development electrode.

5. A process for electrostatographically producing documents comprising the steps of:

producing an electrostatic latent image; developing small details, lines, and the edges of solids portions of said latent image with magnetic toner; and developing the inside of solid areas of said latent image with non-magnetic toner

* * * * *